March 15, 1932. A. WINTHER 1,849,212
CLUTCH
Filed Oct. 9, 1929 2 Sheets-Sheet 1

Anthony Winther,
Inventor.
Delos G. Haynes,
Attorney

March 15, 1932.  A. WINTHER  1,849,212
CLUTCH
Filed Oct. 9, 1929   2 Sheets-Sheet 2
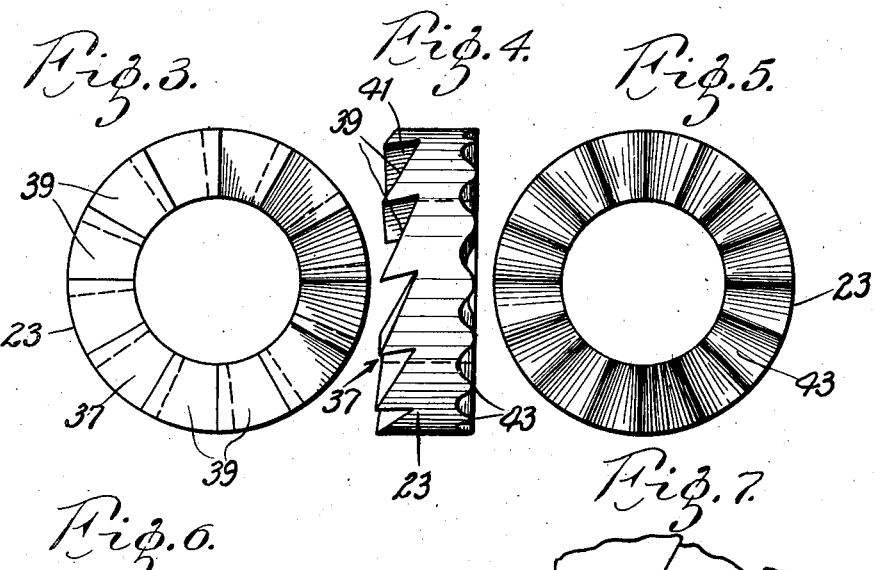
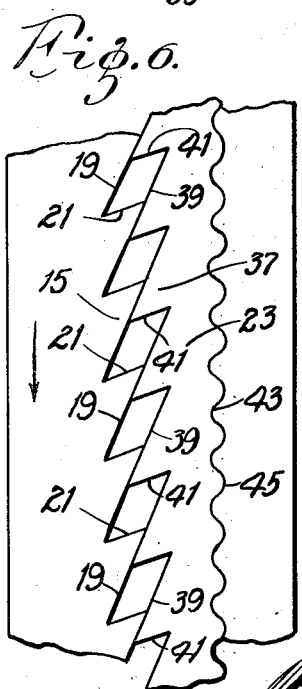
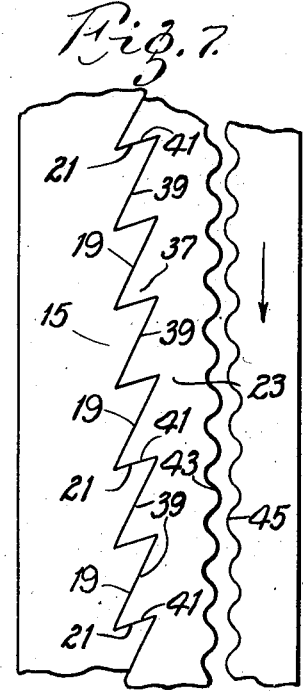
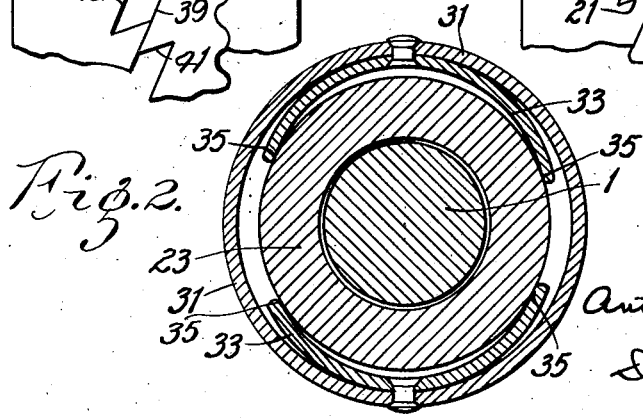

Patented Mar. 15, 1932

1,849,212

UNITED STATES PATENT OFFICE

ANTHONY WINTHER, OF KENOSHA, WISCONSIN, ASSIGNOR TO THE WINTHER COMPANY, OF WILMINGTON, DELAWARE, A CORPORATION OF DELAWARE

CLUTCH

Application filed October 9, 1929. Serial No. 398,350.

This invention relates to clutches, and with regard to certain more specific features to an over-running clutch.

Among the several objects of the invention may be noted the provision of a clutch adapted to control the application of energy flowing from one or more sources to a given point; the provision of a clutch of the class described which is adapted to overcome the disadvantage of uncertainty of engagement now inherent in overrunning clutches; the provision of a clutch of the class described which is independent of centrifugal and inertia forces for its proper operation; the provision of a device of the class described which shall be positive in operation with all grades of lubricants, such as cold, heavy or congealed oil or light, warm oil; and the provision of a device of the class described which shall have a minimum number of rugged, simple parts adapted to be economically manufactured and adapted to stand severe abuse in service. Other objects will be in part obvious and in part pointed out hereinafter.

The invention accordingly comprises the elements and combinations of elements, features of construction, and arrangement of parts which will be exemplified in the structure hereinafter described, and the scope of the application of which will be indicated in the following claims.

In the accompanying drawings, in which is illustrated one of various possible embodiments of the invention, Fig. 1 is a longitudinal section taken through the device, certain portions being shown in elevation;

Fig. 2 is a cross-section taken substantially along line 2—2 of Fig. 1;

Fig. 3 is a plan view of the wedging face of a clutch ring;

Fig. 4 is a side elevation of Fig. 3;

Fig. 5 is a plan view of the right-hand face of Fig. 4, showing the clutch face of said clutch ring;

Fig. 6 is a diagrammatic (developed view, illustrating said clutch ring and its driving and driven elements in closed position; and Fig. 7 is a view similar to Fig. 6 showing the clutch ring disengaged from one of its engaging members.

Similar reference characters indicate corresponding parts throughout the several views of the drawings.

Figure 1:
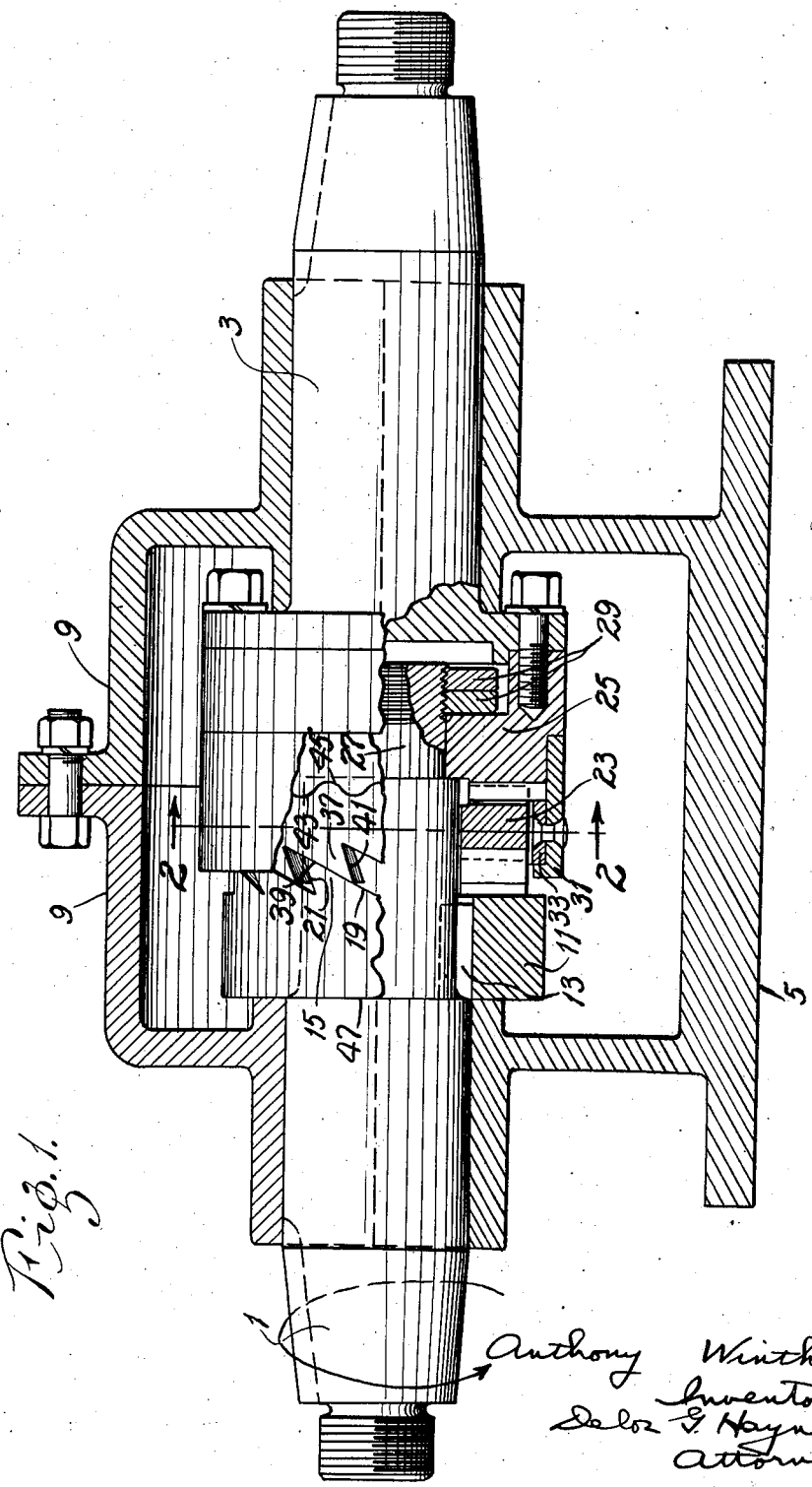

Referring now more particularly to Fig. 1, there are illustrated at numerals 1 and 3 certain members, either of which may comprise a driver or a driven member. For the purpose of description herein the number 1 will be referred to hereinafter as the driver, and the number 3 as the driven. The driver and driven members 1 and 3 respectively are supported in a pillow block, comprising a lower housing portion 5, machined and faced to receive a split cap comprising two bolted housing members 9. From the above it will be seen that the members 5 and 9 form bearings for the members 1 and 3 and also a housing for the engaging mechanism between said members 1 and 3.

Said engaging mechanism or clutch per se connecting the driver and driven members 1 and 3 respectively, comprises a crown member or collar 11 fastened to the driver 1 by means of a key 13. This collar 11 is provided with longitudinally arranged crown teeth 15. As is indicated in Figs. 1, 6 and 7, each tooth 15 has a sloping face 19 and an under-cut back 21. The development of Fig. 6 shows this to best advantage.

The driver 1 has an extension which passes through the toothed portion of the collar 11 and through a clutch ring or intermediate member 23, the special form of which ring will be described more particularly hereinafter. After passing through this ring 23, said driver 1 is extended to pass through and into a pilot bearing ring 25 the latter being bolted to said driven member 3. The pilot ring 25 and the extension 27 of the driver 1 are relatively rotatable. Within the confines of the pilot ring 25 said extension 27 of the driver is threaded and provided with locked nuts 29 for the purpose of maintaining an assembly.

Fastened to and extending from said pilot ring 25 is a collar 31. This collar is rotatable with the ring 25 but has relative rotation with respect to the clutch ring 23. Riveted to opposite sides of said collar 31 are spring members 33 which are so formed as to springingly engage the outer surface of said clutch ring 23 at end points indicated by numerals 35. It is to be understood that the clutch ring 23 is rotatable, both with respect to the driving member 1 and the driven member 3; but, because of the frictional engagement at points 35 with the spring members 33 its tendency is to move with said driven member 3, unless the motion thereof is otherwise resisted. The purpose of this will appear hereinafter.

Referring now to the ring 23 per se, it will be seen to comprise a cylindrical external surface (Figs. 3 to 5 in particular) and a cylindrical internal surface. At the end adjacent the crown member or collar 11 the ring 23 is provided with teeth 37 of crown formation which have substantially the same shapes as said teeth 15, except that the teeth 37 are inverted in circular position. That is to say, the teeth 15 and 37 are complementary. In the case of the teeth 37 the backs 39 are sloped as are the front portions of the teeth 15 and the front portions 41 are undercut as are the back portions 21 of said teeth 15.

The other end or face of the ring 23 is formed with radial corrugations 43, which are complementary to engaging corrugations 45 formed on the opposite face of said pilot ring 25.

It will be appreciated that the clutch ring 23 has longitudinal movement along the extension of the driver 1, and this movement is of a magnitude which, when said corrugations 43 and 45 are in engagement as illustrated in Fig. 6, then the crown teeth 15, 37 will not quite clear one another. On the other hand, when said corrugations 43 and 45 are disengaged and the crown teeth 15, 37 are entirely engaged, as shown in Fig. 7, then the allowable movement is enough so that the corrugations are entirely separated and permit free relative motion between the clutch ring 23 and the pilot ring 25 associated with the driven member. The operation, which is as follows, will clarify the relationship between parts:

Assume first that any motion of the driven member 3 is resisted, and that a couple is applied to the driving member 1. Both members may be assumed to be rotated, but member 1 is driving member 3. The rotation is as indicated by the arrow at Fig. 1, which is clockwise referring to Fig. 2.

The light friction at the contact points 35 between the springs 33 and the clutch ring 23 tends to hold said clutch ring 23 stationary with respect to the driven member 3. Hence rotation of the driver 1 will effect relative movement between the crown member 11 and the clutch ring 23, so that there is effected a sliding action between the sloping surfaces 19 and 39. This action effects a wedging of the clutch ring 23 away from the crown member 11 and hence there is effected engagement between the corrugations 43 of the clutch ring with the corrugations 45 of the pilot ring 25, said pilot ring forming part of the driven member 3. It is to be understood that the exact shape of the corrugations 43 and 45 may be changed within wide limits without appreciably affecting operability. The sinusoidal shapes shown in the drawings have been found satisfactory and are free from appreciable wear. Continued rotation of the driver 1 exerts increasing wedging action and thereby produces a positive lock between the members 11, 23, 25 and hence the rotation of the driven member 3 will follow that of the driver 1.

The thrust due to the wedging action is absorbed by the shoulder 47 of the driver 1, against which the ring 11 acts. The reaction is taken by the nuts 29, also on the driver 1, so that the stresses are in the extension of the driver 1, rather than in the housing comprising members 5 and 9.

If it be next assumed that the relative rotation between the driver 1 and driven members 3 and 25 be reversed to that above assumed, then there will be an overtaking of the driver 1 by the driven element 3. As this occurs, the frictional contacts 35 at the springs 33, cause the clutch ring 23 to remain stationary with respect to the driven element, that is, said clutch ring 23 moves ahead with the said driven element 3. It is here assumed that the driven elements are receiving energy from another source, whereby they are speeded up. This condition may occur in different forms of mechanism. The above overtaking action results in the surfaces 19 and 39 temporarily separating and the surfaces 21 and 41 approaching each other until they contact. When contact occurs between surfaces 21, 41, the clutch ring 23 rides toward the ring 11 and away from the ring 25, so that the corrugations 43, 45 are separated, as indicated in Fig. 7. It will be seen that as said undercut surfaces 21, 41 engage, there results a positive drawing over of the clutch ring until there occurs complete complementary engagement as illustrated in Fig. 7. This means that the mechanical connection between the driver 1 and driven member 3 is completely broken except for the practically inappreciable frictional drive at points 35. This positive opening is advantageous and it will be seen that it does not depend merely upon the separating action effected by the corrugations 43, 45 but also upon the drawing over due to the undercutting and driving action of springs 33.

It will be understood from the above that the function of the springs 33 is to enhance the action making it positive under all sort of conditions. They also function as friction dampers and have the effect of preventing the intermediate ring 23 from rattling and vibrating whereby smooth action is had. It will be seen that even if the springs 33 were removed that the functions above described would still take effect. For instance, with oil, as indicated in Fig. 1, the drag effected by the oil between the ring 23 and the driven member would in some degree replace the driving function and friction damper function of said springs 33. It will also be seen that the angularity between the surfaces 21, 41 withdraws engagement between the corrugations 43 and 45, whether the ring 23 be oil driven or spring driven.

It will be understood that the driving member 1 and the driven member 3 are connected to a suitable mechanism such as an automotive transmission wherein it becomes desirable to drive the member 3 from the member 1, but on the other hand permit said member 3 to overrun member 1 when it is driven faster than the driver 1.

The present invention comprises a distinct improvement over prior types of clutches commonly known as "roller ratchets" or the like. In actual service conditions, the present clutch has been found to be unfailing in operation whether operated in a cold, heavy or congealed oil bath or in a light, warm oil bath. An increase in the viscosity of the oil bath or lubricant has the effect of enhancing its ability to function as a friction damper comparable to the springs 33. Thus under adverse lubricating conditions, the present clutch operates better, whereas with prior devices failure in operation often occurred where the lubricant became heavy. Another advantage of the present invention is that the engagement when the mechanism is closed is exceedingly smooth. As a result, harsh clashing and excessive wear is eliminated. Furthermore, the device is practically noiseless. It will also be seen that inasmuch as there is never excessive relative motion between the springs 33 and the ring 23 that a predetermined frictional effect at points 35 is maintained throughout the life of the device.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a device of the class described, a driving member, a driven member, sloping and undercut teeth associated with said driving member, an intermediate member having complementary teeth to said first-named teeth, whereby said intermediate member may be wedged away from the driving member under one condition of relative movement and drawn toward the same under another condition of relative movement and frictional means between said driven member and said intermediate member operable independently of any driving connection between them.

2. In a device of the class described, a driving member, a driven member, sloping and undercut teeth associated with said driving member, an intermediate member having complementary teeth to said first-named teeth, whereby said intermediate member may be wedged away from the driving member under one condition of relative movement and drawn toward the same under another condition of relative movement, said driven member having a corrugated face, a face on said intermediate member complementary to said corrugated face, whereby said intermediate member is adapted to drive said driven member when wedged thereagainst by said wedging means, and friction damping means between said driven member and said intermediate member operable independently of said engaging and disengaging means.

In testimony whereof, I have signed my name to this specification this 3rd day of October, 1929.

ANTHONY WINTHER.